US 7,353,414 B2

(12) United States Patent
Chrysos

(10) Patent No.: US 7,353,414 B2
(45) Date of Patent: Apr. 1, 2008

(54) CREDIT-BASED ACTIVITY REGULATION WITHIN A MICROPROCESSOR BASED ON AN ALLOWABLE ACTIVITY LEVEL

(75) Inventor: George Chrysos, Milford, MA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 11/095,339

(22) Filed: Mar. 30, 2005

(65) Prior Publication Data

US 2006/0230256 A1   Oct. 12, 2006

(51) Int. Cl.
*G06F 1/32* (2006.01)
(52) U.S. Cl. .................... 713/320; 713/323
(58) Field of Classification Search ............... 713/320, 713/323
See application file for complete search history.

(56) References Cited

U.S. PATENT DOCUMENTS

| 5,719,800 | A * | 2/1998 | Mittal et al. ............... 713/321 |
| 6,826,704 | B1 * | 11/2004 | Pickett ....................... 713/320 |
| 6,901,524 | B2 * | 5/2005 | Watts, Jr. ..................... 713/322 |
| 6,931,559 | B2 * | 8/2005 | Burns et al. ................ 713/340 |
| 7,114,086 | B2 * | 9/2006 | Mizuyabu et al. ......... 713/320 |
| 7,194,643 | B2 * | 3/2007 | Gonzalez et al. .......... 713/320 |
| 2004/0054857 | A1 * | 3/2004 | Nowshadi .................. 711/153 |
| 2004/0226016 | A1 * | 11/2004 | Sreejith ..................... 718/104 |
| 2006/0206740 | A1 * | 9/2006 | Hurd ......................... 713/322 |
| 2006/0206898 | A1 * | 9/2006 | Miner et al. ............... 718/104 |

* cited by examiner

*Primary Examiner*—Chun Cao
(74) *Attorney, Agent, or Firm*—Trop, Pruner & Hu, P.C.

(57) ABSTRACT

A technique to control power consumption within a microprocessor. More particularly, embodiments of the invention relate to a technique to control power and performance within one or more microprocessors by enforcing a credit-based instruction execution rate algorithm.

27 Claims, 4 Drawing Sheets

CREDIT-BASED ACTIVITY REGULATION WITHIN A MICROPROCESSOR BASED ON AN ALLOWABLE ACTIVITY LEVEL

FIELD

Embodiments of the invention relate to microprocessors and microprocessor systems. More particularly, embodiments of the invention relate to regulating the activity level of one or more microprocessors based on the accumulation and expenditure of instruction execution rate credits.

BACKGROUND

As processor clock speeds increase and power consumption budgets decrease, processor and computer system designers must develop new ways to control power without degrading performance. Power and performance considerations become increasingly significant as the number of processors within a microprocessor die or the number of processors on separate die within the same computer system increases.

Typically, microprocessor and computer system designers must work within a voltage/frequency ("V/f") envelope when designing the processor system. For example, a processor having multiple processor cores may be capable of operating each core at a maximum frequency at certain operating voltage levels. However, the processor or system may have to be designed such that the processors do not operate at their maximum frequency across all possible operating voltages for extended periods of time, because doing so may result in damage to one or more of the processors or the computer system.

Dynamic power consumption of a processor or computer system can be calculated using various equations or algorithms, including: $P=A*C*V^2*f$, where "P" is power, "A" is activity of the processor or system, "C" is the capacitance observed by the processor or system, "V" is the operating voltage, and "f" is the frequency of the processor(s). Prior art techniques for preventing a processor or system from exceeding the maximum sustainable voltage and frequency include analog detection mechanisms that sense when a processor or system is becoming too hot or consuming too much current. The detection mechanism may then force the voltage and/or frequency lower in response to detecting that the processor or system has exceeded thermal or current consumption limits.

Analog detection mechanisms, however, are limiting in the sense that processor or system performance is not determinable and may depend upon the manufacturing characteristics of the processor or system, operating environment, and other factors. Furthermore, analog detection mechanisms may require that the voltage and frequency of the processor or system be set at conservative levels to ensure enough time to react to sudden variations in current drawing or thermal events. These variations can be caused by changes in activity level on the processor or system due to program execution characteristics. For example the processor might be mostly idle, waiting for data to return from main memory one moment, and in the next moment, when the data has returned, it may be executing instructions at peak rate.

Prior art power control techniques include micro-architectural regulating techniques, such as controlling the number of instructions issued within a processor per processor cycle. Typically, instruction issue rate control techniques prevent the processor from issuing instructions for execution per cycle above a certain threshold. The maximum instruction rate is typically set once for a relatively long interval on the processor, (i.e. the instruction rate control threshold cannot be changed numerous times in short succession during the normal operation of the processor ("dynamically"), but must be changed, if at all, by firmware or software writing a configuration register at longer range intervals.

As with analog detection mechanisms, typical instruction rate control techniques require a conservative approach in order to prevent the processor from being harmed in the event of a sudden variation in current, performance, or thermal characteristics of the processor. In the case of prior art instruction rate control techniques, this means that a sudden increase in performance demand cannot be handled by the processor, thereby incurring performance penalties.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessors and computer systems. More particularly, embodiments of the invention relate to a technique to control power and performance within one or more microprocessors by enforcing a credit-based instruction execution rate algorithm.

Embodiments of the invention accommodates variations in activity levels due to variations in performance demand on a processor while protecting the processor or computer system from current or thermal events that can harm the processor or system. Embodiments of the invention may be used within a single core microprocessor, within a multi-core processor, or within a multi-processor computer system.

At least one embodiment of the invention accommodates variations in performance demand while enforcing an average activity limit by allowing the average instruction issue rate within a processor to fluctuate according, to an accumulative "credit" system. In other embodiments, the credit system can be used in conjunction with other variations within the processor besides the instruction issue rate. For example, in one embodiment, the credit system described herein may be used in conjunction with variations in the instruction decoding rate, retirement rate, or some combination of the instruction decoding, retirement, and/or issue rate.

Figure 1:
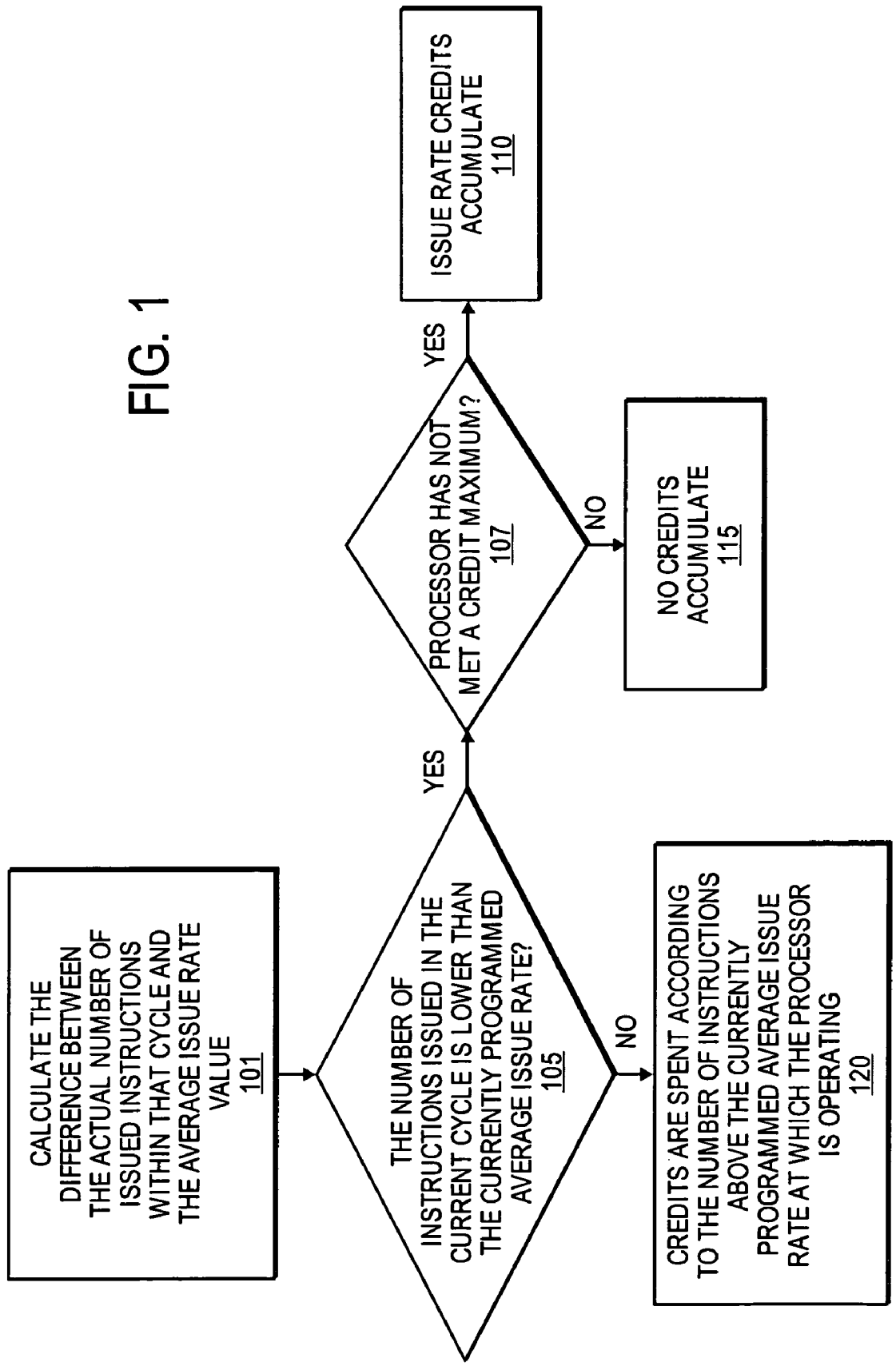
FIG. 1 is a flow diagram illustrating operations used according to embodiment of the invention.

In one embodiment, an average instruction issue rate within a processor is controlled according to an algorithm illustrated in FIG. 1. In FIG. 1, at each processor cycle, the difference between the actual number of issued instructions within that cycle and the average issue rate value is calculated at operation 101. In one embodiment, the average issue rate is a variable value that can be programmed into the processor at various points during the operation of the processor by a software or firmware program. In other embodiments, the average issue rate is not variable and cannot be changed, if at all, without rebooting the processor. If the number of instructions issued in the current cycle is lower than the currently programmed average issue rate at operation 105, then issue rate credits accumulate at operation 110, such that if the processor has not exceeded a credit maximum at operation 107, the processor may exceed the average issue rate during subsequent processor cycles until the credits are exhausted. If the credit maximum has been met, then no further credits may be accumulated, if at all, until the number of credits falls below the credit maximum at operation 115.

In one embodiment, the credit maximum is a variable value that can be programmed into the processor at various points during the operation of the processor by a software program. In other embodiments, the credit maximum is not variable and cannot be changed, if at all, without rebooting the processor. The credit maximum may be dependent upon various operating factors of the processor or computer system. For example, if the credit maximum is set too high, bursts of activity causing greater performance demands on the processor may be allowed to persist for relatively long periods of time, which may result in excessive power demands or fluctuations within the processor or system. Accordingly, the credit maximum is set, in one embodiment, to a level accounting for the possible thermal or current fluctuations that may occur during the operation of the processor.

In one embodiment, the credit maximum corresponds to the maximum allowable instruction issue burst length within the processor. However, in other embodiments, the credit maximum may correspond to other processing characteristics, such as the instruction decode rate, retirement rate, or some combination of the instruction decode, retirement, and/or instruction burst length.

If the number of instructions issued in the current cycle is higher than the currently programmed average issue rate operation 105, then credits are spent according the number of instructions above the currently programmed average issue rate at which the processor is operating at operation 120. Credits continue to be spent as long as the processor operates above average issue rate until all credits are exhausted. The processor must then operate at an issue rate not greater than the average issue rate until more credits, if any, are accumulated.

Figure 2:
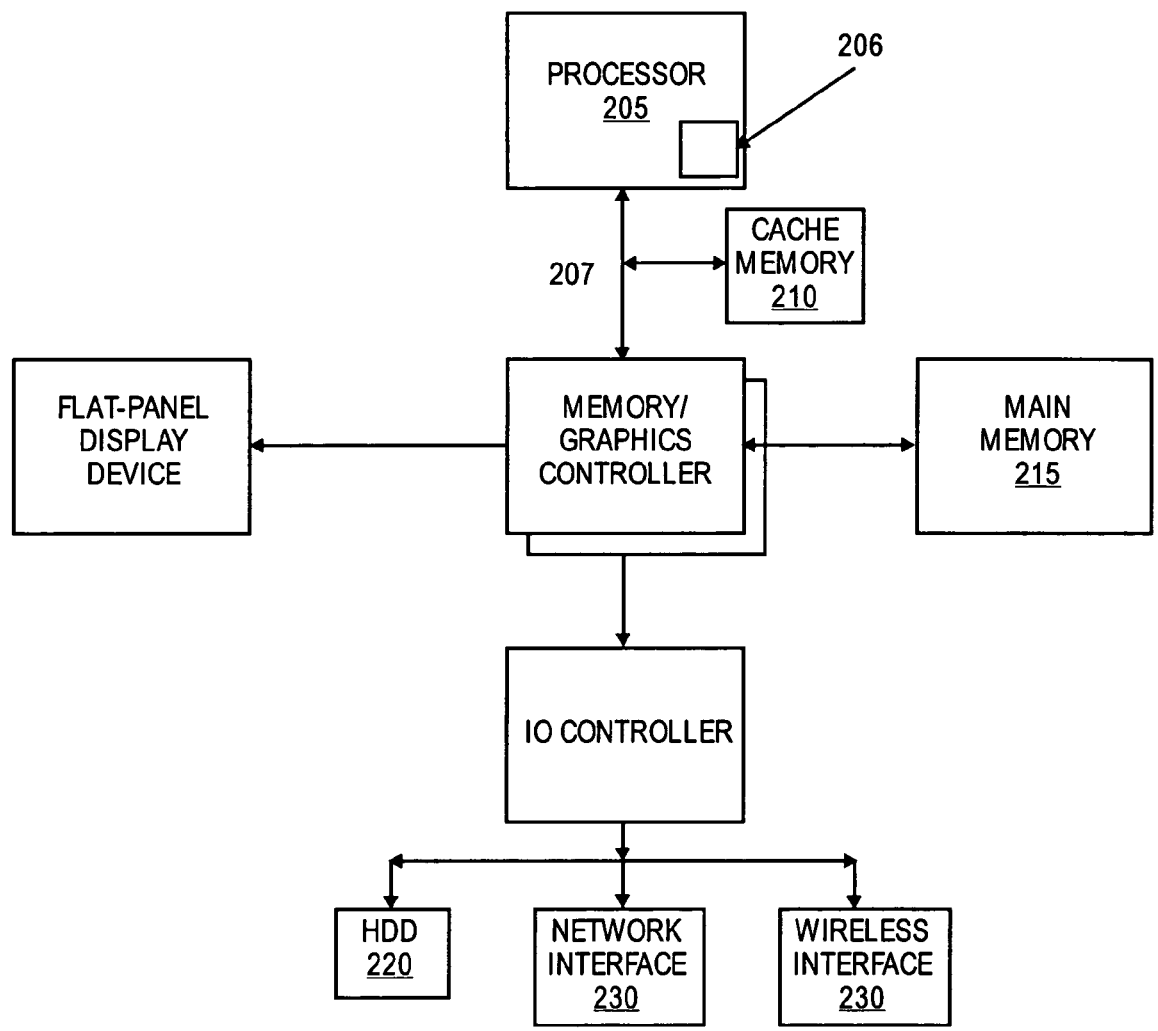
FIG. 2 is a front-side-bus (FSB) computer system in which one embodiment of the invention may be used.

FIG. 2 illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache, which comprise an inclusive cache hierarchy in which coherency data is shared between the L1 and L2 caches.

Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
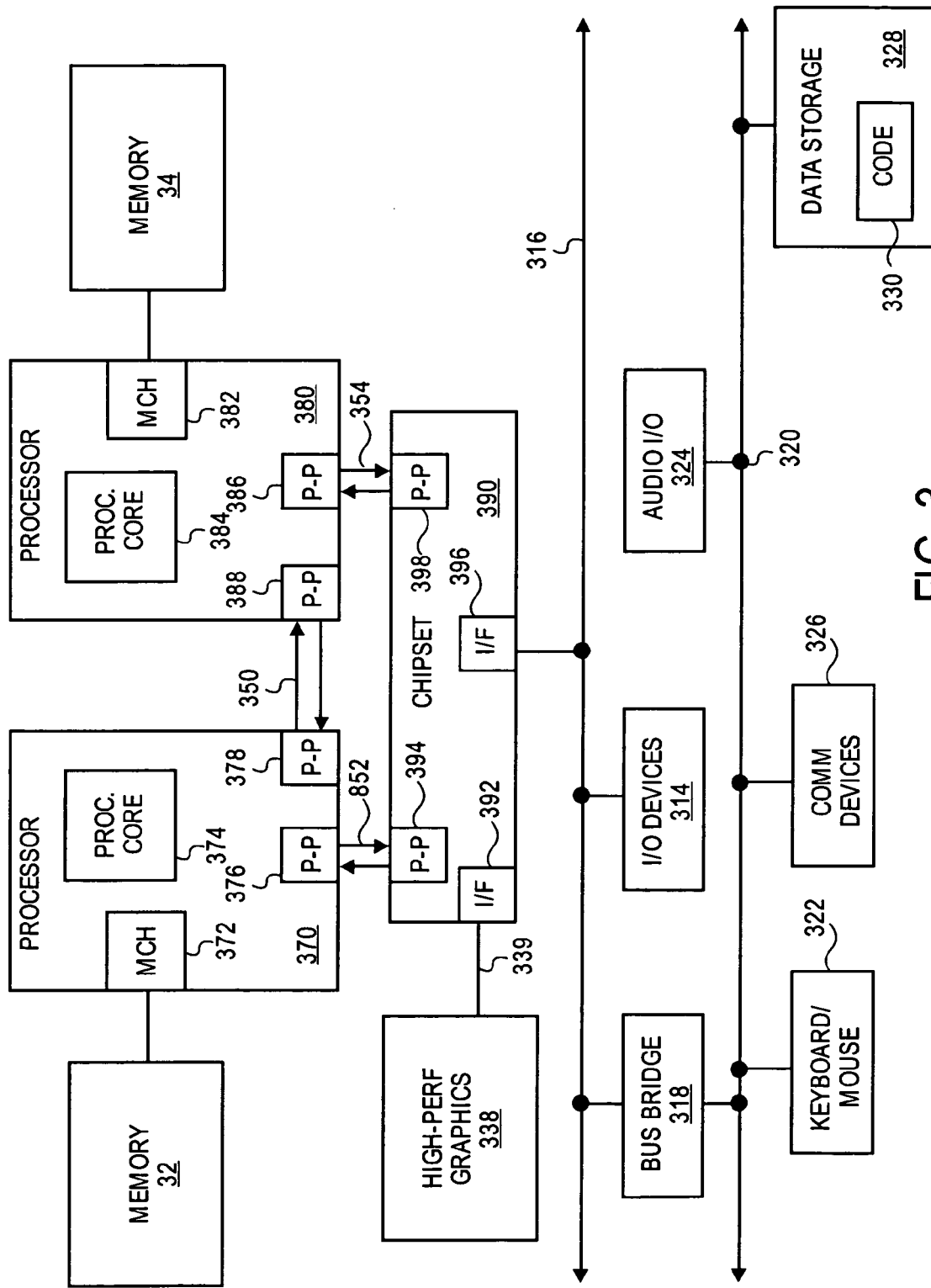
FIG. 3 is a point-to-point (PtP) computer system in which one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 22, 24. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
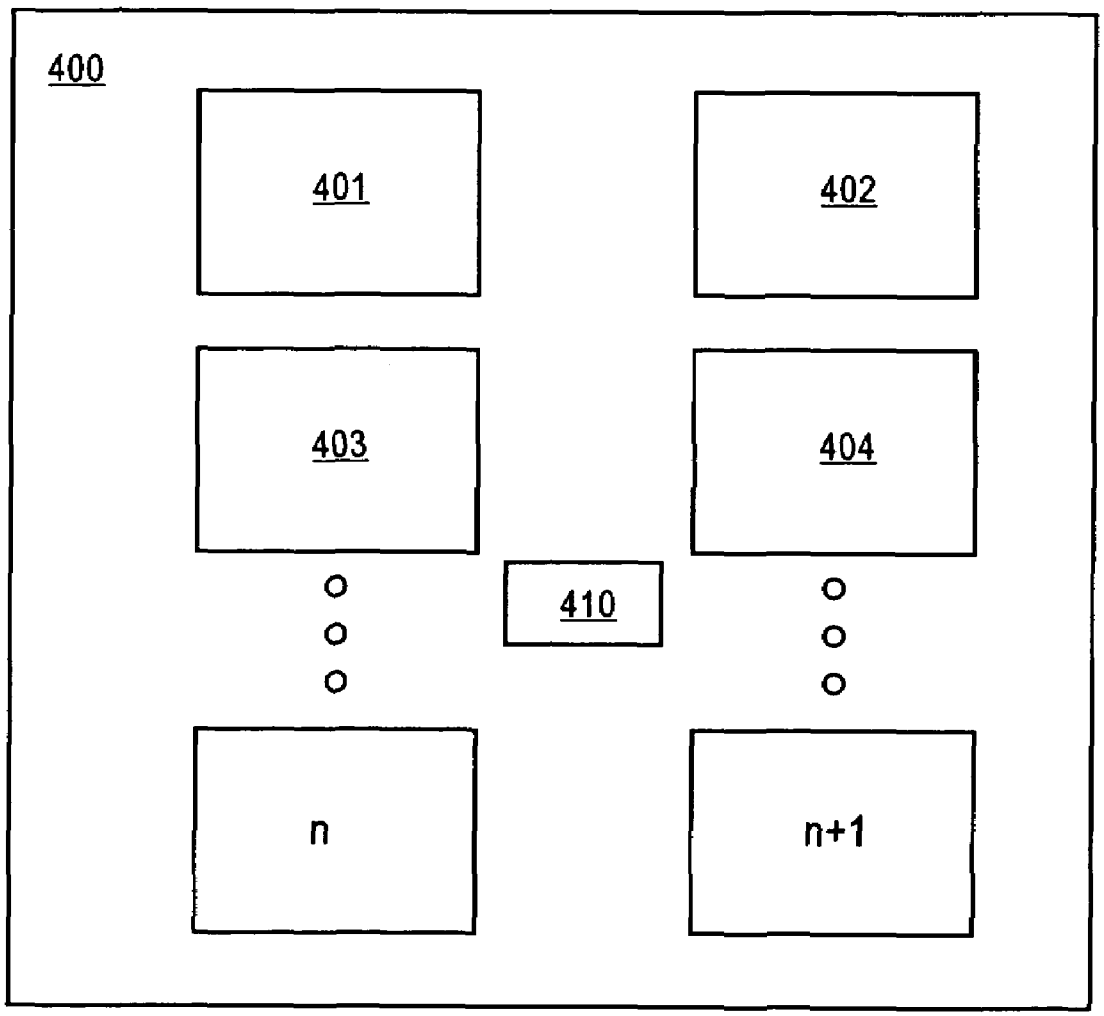
FIG. 4 is a multi-core microprocessor in which one embodiment of the invention may be used.

FIG. 4 illustrates a multi-core processor in which at least one embodiment of the invention may be used. Particularly, multi-core processor 400 includes processor cores 401 through "n", each having their activity controlled according to one embodiment of the invention being implemented within a logic circuit 410. In other embodiments the logic circuit may be within one of the processor cores or distributed throughout the cores. Furthermore, other embodiments may be implemented within a software routine being performed within or outside of one of the processor cores.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
a processing core, a processing rate of which is to be controlled, at least in part, according to a number of activity level credits, which corresponds to an extent to which the processing core has experienced a first activity level, wherein the number of activity level credits is to increase if the first activity level is below an average allowable activity level.

2. The apparatus of claim 1 wherein the number of activity level credits is limited by a maximum allowable number of activity level credits.

3. The apparatus of claim 2 wherein the maximum allowable number of activity level credits is dependent upon a range of activity levels to be experienced by the processing core.

4. The apparatus of claim 1 wherein the number of activity level credits is to decrease if the first activity level is above the average allowable activity level.

5. The apparatus of claim 1 wherein the number of activity level credits corresponds to a number of instructions exceeding the average allowable activity level that can be issued within the processing core.

6. The apparatus of claim 1 further comprising a plurality of processing cores, the activity levels of which are to contribute to an aggregate number of activity level credits for all of the processing cores.

7. The apparatus of claim 6 wherein the aggregate number of activity level credits is to increase if a sum of activity levels of the plurality of processing cores is below an average aggregate allowable activity level.

8. The apparatus of claim 7 wherein the aggregate number of activity level credits is to decrease if the sum of activity levels of the plurality of processor cores is above the average aggregate allowable activity level.

9. A system comprising:
a microprocessor, an activity level of which being effected, at least in part, by a difference between a number of issued instructions and a modifiable allowed number of issued instructions, the difference corresponding to a credit level indicative of the number of issued instructions above the modifiable allowed number of issued instructions that the microprocessor can issue.

10. The system of claim 9, wherein if the number of issued instructions is greater than the modifiable allowed number of issued instructions, the activity level is to be reduced by reducing the number of issued instructions.

11. The system of claim 10 wherein if the number of issued instructions is less than the modifiable allowed number of issued instructions, the activity level is allowed to be increased by increasing the number of issued instructions without exceeding a maximum number of allowed issued instructions.

12. The system of claim 11 wherein the maximum number of allowed issued instructions is dependent upon a range of activity levels to be experienced by the microprocessor.

13. The system of claim 12 wherein an operating voltage and processing frequency of the microprocessor is to be selected to maximize the number of instructions that may be issued by the microprocessor without corrupting data within the microprocessor or otherwise physically damaging the microprocessor.

14. The system of claim 9 further comprising a plurality of microprocessors, each contributing to an aggregate activity level being effected, at least in part, by a difference between a number of issued instructions of each of the plurality of microprocessors and an aggregate modifiable allowed number of issued instructions.

15. The system of claim 14 further comprising a logic circuit to compare the number of issued instructions with the aggregate modifiable allowed number of issued instructions and to modify an activity level of at least one of the plurality of microprocessors in response thereto.

16. The system of claim 15 wherein the activity level is to be modified by increasing or decreasing the number of instructions to be issued by at least one of the microprocessors.

17. A machine-readable medium having stored thereon a set of instructions, which if executed by a machine, cause the machine to perform a method comprising:
detecting a first number of issued instructions per cycle;
comparing the first number of issued instructions per cycle with a modifiable allowed number of issued instructions per cycle;
reducing a number of credits by an amount corresponding to a number of issued instructions per cycle that the first number is above the modifiable allowed number; and
allowing the number of credits to be increased by an amount corresponding to a number of issued instructions per cycle that the first number is below the modifiable allowed number.

18. The machine-readable medium of claim 17 wherein the number of credits is not to exceed a maximum number of credits, the maximum number of credits corresponding to a range of possible activity levels.

19. The machine-readable medium of claim 18 wherein the method further comprises modifying the modifiable allowed number of issued instructions per cycle to reflect the range of possible activity levels.

20. The machine-readable medium of claim 19 wherein the method further comprises choosing a processor voltage and frequency to allow a maximum number of instructions to be issued without incurring data corruption or structural damage within a processor.

21. A method comprising:
changing a number of activity level credits based on an extent to which an activity level within a semiconductor circuit varies from an average allowable activity level;
subsequently exceeding the average allowable activity level based on the number of activity level credits; and
consuming the number of activity level credits by a number of instructions issued in a cycle that exceeds the average allowable activity level.

22. The method of claim 21 further comprising accruing a maximum amount of activity level credits, the maximum amount of activity level credits being dependent upon a range of activity levels to be experienced by the semiconductor circuit.

23. The method of claim 22 further comprising varying the maximum amount of activity level credits during operation of the semiconductor circuit.

24. The method of claim 22 wherein the maximum amount of activity level credits corresponds to a number of instructions that may be issued within the semiconductor circuit.

25. The method of claim 21 further comprising calculating a difference between the average allowable activity level and a number of issued instructions during a cycle of the semiconductor circuit, and changing the number of activity level credits according to the difference.

26. The method of claim 25 further comprising changing the average allowable activity level during operation of the semiconductor circuit without rebooting the semiconductor circuit.

27. The method of claim 21 further comprising operating the semiconductor circuit at an activity level not greater than the average allowable activity level if the number of activity level credits is equal to zero.

* * * * *